(12) United States Patent
Kobayashi

(10) Patent No.: US 7,901,501 B2
(45) Date of Patent: Mar. 8, 2011

(54) INKJET INK COMPOSITION

(75) Inventor: Yukari Kobayashi, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 883 days.

(21) Appl. No.: 11/703,642

(22) Filed: Feb. 8, 2007

(65) Prior Publication Data

US 2007/0191509 A1 Aug. 16, 2007

(30) Foreign Application Priority Data

Feb. 10, 2006 (JP) ................................. 2006-033994

(51) Int. Cl.
*C09D 11/02* (2006.01)
*C08K 3/22* (2006.01)

(52) U.S. Cl. ........ 106/31.65; 106/31.9; 522/83; 524/847; 524/849

(58) Field of Classification Search ........................ None
See application file for complete search history.

(56) References Cited

U.S. PATENT DOCUMENTS

| | | | |
|---|---|---|---|
| 4,089,800 A | | 5/1978 | Temple |
| 4,925,827 A | * | 5/1990 | Goto et al. ..................... 503/207 |
| 5,509,960 A | * | 4/1996 | Simpson et al. .............. 106/437 |
| 2004/0246319 A1 | * | 12/2004 | Ito et al. ........................ 347/100 |
| 2005/0117009 A1 | | 6/2005 | Kawaguchi et al. |
| 2006/0275606 A1 | * | 12/2006 | Mizutani ....................... 428/404 |

FOREIGN PATENT DOCUMENTS

| | | |
|---|---|---|
| EP | 1 321 497 A | 6/2003 |
| JP | 2002-347336 A | 12/2002 |
| JP | 2004-18546 A | 1/2004 |
| JP | 2004-059857 A * | 2/2004 |
| WO | WO 02/074431 A1 * | 9/2002 |

OTHER PUBLICATIONS

Machine translation of JP 2004-059857 A, provided by the JPO website (2004).*
Brochure for Tioxide® TR92, provided by Huntsman (no date).*
European Search Report dated Feb. 12, 2008.

* cited by examiner

*Primary Examiner* — Michael J Feely
(74) *Attorney, Agent, or Firm* — Sughrue Mion, PLLC

(57) ABSTRACT

The invention provides an inkjet ink composition comprising: a white pigment; a polymerizable compound; and a polymerization initiator. The white pigment includes at least one of inorganic hollow particles or inorganic-organic hybrid hollow particles. A ratio of an average inside diameter of cavities in the at least one of inorganic hollow particles or inorganic-organic hybrid hollow particles to an average outside diameter of the at least one of inorganic hollow particles or inorganic-organic hybrid hollow particles is in a range of from 0.4 to 0.95. Further, a volume average particle diameter of the at least one of inorganic hollow particles or inorganic-organic hybrid hollow particles is in a range of from 0.01 to 1.0 μm.

10 Claims, No Drawings

INKJET INK COMPOSITION

BACKGROUND OF THE INVENTION

1. Field of Invention

The invention relates to an inkjet ink composition. More specifically, the invention relates to an inkjet ink composition which restrains a pigment therein from precipitating, does not cause clogging of an inkjet ink nozzle, and provides a film excellent in weather resistance and heat resistance after the composition is cured.

2. Description of Related Art

White ink is used in fields such as printing. It is essential that a white ink exhibits a high performance in terms of both masking property and coloring property. For example, when a white ink is printed onto a colored medium, the color of the colored medium may be seen through the printed ink when the masking property of the ink is poor, and since this results in poor color-reproducibility, a white ink is first painted onto the medium, and a different color ink is then painted thereon. For this reason, the use amount of white ink is larger than that of inks having other colors, and the demand for white ink is steadily increasing. Screen printing is frequently used as a method for applying a white ink. However, screen printing has the problems that it is limited to printing on planar recording media and delicate depiction is difficult to achieve thereby.

On the other hand, the use of inkjet recording has been expanding because recording thereby is easier and more compact compared to recording by conventional recording methods, and because it is a non-contact type recording method, which enables recording onto a three-dimensional medium. Recently, inkjet ink has been applied to outdoor exhibits, pottery and the like. Thus, such inks are required to have weather resistance and heat resistance.

The use of white ink in inkjet recording has made it possible to solve the problems inherent to conventional screen printing and to attain printing onto a three-dimensional medium, as well as printing having delicate depiction.

In inkjet recording, the viscosity of an ink is required to be low. However, white inkjet ink has the problem that the ink is poor in dispersion stability, such that a pigment contained therein easily precipitates. When the precipitated pigment solidifies, an inkjet nozzle may clog, resulting in an unclear printed image or the occurrence of printing omissions. Thus, a white inkjet ink which has a low viscosity and an excellent dispersion stability is desired.

Methods including using a white organic pigment, organic hollow particles or the like as a white pigment in a white inkjet ink having improved visibility and dispersion stability have been proposed (see, for example, Japanese Patent Application Laid-Open (JP-A) No. 2004-18546). However, when a white organic pigment or organic hollow particles are used as a white pigment, there remains the problem that the pigment is poor in weather resistance and heat resistance.

Methods including using titanium oxide, which has a large specific gravity, as a white pigment in an ink, and developing a dispersing agent so as to provide dispersion stability to the ink, have been also proposed (see, for example, JP-A No. 2002-347336). However, the problem of white inkjet recording ink whereby a pigment contained therein precipitates is not substantially solved thereby.

SUMMARY OF THE INVENTION

The invention provides a white inkjet ink composition in which a pigment contained therein is excellent in dispersion stability, which does not cause clogging of an inkjet ink nozzle, and which has a film excellent in weather resistance and heat resistance after the composition is cured.

The inventors have persevered with intensive research with the result that they have succeeded in further improving the dispersion stability of a pigment in an inkjet ink composition by use of organic hollow particles or inorganic-organic hybrid hollow particles as a white pigment in the composition. The inventors have found that the precipitation of the pigment is suppressed such that clogging of an inkjet nozzle is prevented and, further, that the use of the inorganic or inorganic-organic hybrid hollow particles makes it possible to impart weather resistance and heat resistance, which are necessary for articles used outdoors or for pottery and porcelain, to the inkjet ink composition. Thus, the invention has been made.

Namely, the inkjet ink composition of the invention is an inkjet recording, radial-ray-curable ink composition comprising: a white pigment; a polymerizable compound; and a polymerization initiator, wherein the white pigment comprises at least one of inorganic hollow particles or inorganic-organic hybrid hollow particles.

In the invention, it is preferable that a ratio of an average inside diameter of cavities in the at least one of inorganic hollow particles or inorganic-organic hybrid hollow particles to an average outside diameter of the at least one of inorganic hollow particles or inorganic-organic hybrid hollow particles is in a range of from 0.4 to 0.95. Further, it is preferable in the invention that a volume average particle diameter of the at least one of inorganic hollow particles or inorganic-organic hybrid hollow particles is in a range of from 0.01 to 1.0 μm.

DETAILED DESCRIPTION OF THE INVENTION

The inkjet ink composition provided by the present invention is hereinafter described in detail.

The inkjet ink composition includes at least: (a) a white pigment; (b) a polymerizable compound; and (c) a polymerization initiator. The (a) white pigment comprises at least one of inorganic hollow particles or inorganic-organic hybrid hollow particles.

(a) White Pigment

The ink composition of the invention contains at least a white pigment. The white pigment used in the invention includes at least one of inorganic hollow particles or inorganic-organic hybrid hollow particles, which may be hereinafter referred to as "specific hollow particle(s)".

The wording "hollow particle" means a particle having a cavity inside thereof. The particle shape of the hollow particles is not particularly limited. Thus, the hollow particles may be spherical particles, concave and convex (which may be irregularly-shaped) particles, deformed particles or the like. The shape of the cavity in each of the hollow particles is not limited to a configuration such that a spherical cavity is present inside the particle. The cavity may have a configuration such that pores are present in a part or the whole of the particle. The presence of the cavity enables a hollow particle to be provided with the unique characteristics that the particle has a small specific gravity, and is excellent in thermal insulation performance and light scattering property. The specific hollow particles in the invention are preferably particles having a high light scattering property.

The volume average particle diameter of the specific hollow particles (i.e., the 50% accumulation diameter of the particles in an integral distribution curve wherein the particle diameter is plotted along the transverse axis, and the accumulation value of the particle frequency (the ratio of a volume relative to the whole) is plotted along the vertical axis), which will be referred to merely as the "average particle diameter" hereinafter, is preferably in a range of 0.01 to 1.0 μm, more preferably in a range of 0.05 to 0.7 μm, and even more preferably in a range of 0.1 to 0.5 μm.

The maximum particle diameter of the specific hollow particles (i.e., the 90% accumulation diameter of the particles in the integral distribution curve, wherein the particle diameter is plotted along the transverse axis, and the accumulation value of the particle frequency (the ratio of a volume relative to the whole) is plotted along the vertical axis), is preferably 5 μm or less, and more preferably 1 μm or less. The ratio of the inside diameter of the cavities in the hollow particles to the outside diameter of the particles, which represents the porosity of the particles, is preferably in a range of 0.4 to 0.95, more preferably in a range of 0.5 to 0.93, and even more preferably in a range of 0.6 to 0.9. The inside diameter of the cavities is the average inside diameter of all of the cavities in the particles, and the outside diameter of the particles is the average outside diameter of the particles.

The diameter of the particles can be controlled by selecting a pigment, a dispersing agent and/or a dispersing medium, and/or by setting dispersing and/or filtrating conditions.

When the particle diameter of the specific particles is in the above range, clogging of a head nozzle can be suppressed, and the storage stability of the ink and the curing sensitivity thereof can be maintained.

Both of the "volume average particle diameter" and "the maximum particle diameter" in the invention are values measured using a laser diffracting/scattering method, and the ratio of the inside diameter of the cavities to the outside diameter of the particles is a value measured by measurement based on photographs in which sections of the particles are photographed with a transmission electron microscope (TEM).

Among the specific hollow particles, the inorganic hollow particle is a hollow particle made only of an inorganic material.

Examples of the inorganic hollow particles include particles of titanium oxide, silicon oxide and zinc oxide. Titanium oxide is preferable from the viewpoint of masking property. Hollow particles exhibit not only light scattering on the surfaces of the particles but also light scattering between their shells and their cores are caused. Thus, silicon oxide or zinc oxide may be used.

Examples of the method for producing the inorganic hollow particles include the following processes (A) to (D):

(A) Organic Bead Template Method

In a case where the hollow particles are made of titanium oxide by an example of the organic bead template method, a hydrolysis reaction of a metal alkoxide can be used to form a titanium oxide layer on each of organic polymer particles, and then the resultant is fired at a high temperature to yield the inorganic hollow particles. When the oxidized surfaces exhibit photocatalyst activity, it is preferable to subject the particles to surface treatment with Al, Si, Zr—Al or the like in order to prevent the cured titanium oxide layer film from decomposing.

Examples of the organic bead template method further include a generally-described method including coating peripheries of organic beads with a material which forms shells by selective precipitation onto surfaces of core particles by use of surface electric charges, thereby yielding hollow particles. The coated particles are filtrated and dried, and then the organic cores are removed therefrom so that the coated particles turn to inorganic hollow particles. Examples of the removing method include a thermal decomposition method and a chemical decomposition method. Examples of the material which can be used for the organic bead template method include silica, titania, zinc sulfide, cadmium sulfide and the like.

(B) Emulsion Template Method

The emulsion template method typically includes incorporating water phase into an oil phase containing colloidal particles for being caused to adhere onto interfaces of emulsion droplets. Subsequently, self-organization of the colloidal particles is motivated by the tendency to reduce the total area thereof so that the colloidal particles in the oil phase adhere onto the interfaces of the emulsion droplets. In this way, the interfaces of the droplets are completely covered with the particles. Examples of the material which can be used for the emulsion template method include calcium carbonate or silica.

(C) Spray-Injectant Thermal Decomposition Method

The spray-injectant thermal decomposition method typically includes pouring a solution of a precursor into an ultrasonic nebulizer, the frequency of which is controlled. The resultant aerosol is shifted into a reaction furnace having two heaters in a reducing or oxidizing atmosphere. Hollow particles can be produced by surface solidification of the small droplets on the basis of a large drying speed of the droplets under heating conditions.

(D) Electrostatic Spray Method

The electrostatic spray decomposition method typically includes dropping droplets into an alcohol bath with an electrostatic sprayer so that surfaces of the droplets are dehydrated and solidified, whereby hollow particles can be produced.

Among the specific hollow particles, the inorganic-organic hybrid hollow particle is a hollow particle made of both of an inorganic material and an organic material.

Examples of the inorganic material used in the inorganic-organic hybrid hollow particle include titanium oxide, silicon oxide, and zinc oxide. Examples of the organic material used in the inorganic-organic hybrid hollow particle include particles made of a polymer having a high crosslinking degree such as an acrylic polymer, a vinyl polymer or a styrene polymer.

The embodiments of the mixture of the inorganic material and the organic material in the inorganic-organic hybrid hollow particle is not particularly limited. Examples of the hybrid hollow particle include a hollow particle formed by coating a surface of an organic hollow particle with an inorganic material.

In a case where the inorganic-organic hybrid hollow particle is a hollow particle which is formed by coating a surface of an organic hollow particle with an inorganic material, examples of the process for producing the hybrid hollow particles include a process including forming a titanium oxide layer onto the surface of the organic hollow particle by using a hydrolysis reaction of a metal alkoxide. Examples of the organic hollow particle include: SX series (trade name, manufactured by JSR Co.); OPTO BEADS series (trade name, manufactured by Nissan Chemical Industries, Ltd.); and MICROSPHERE MFL series (trade name, manufactured by Matsumoto Yushi-Seiyaku Co., Ltd).

When the oxidized surface of the hollow particle exhibits the photocatalyst activity, it is preferable to subject the particles to a surface treatment with at least one of Al, Si, Zr—Al and the like in order to prevent the cured film from decomposing.

The content by percentage of the specific hollow particle in the ink composition is preferably in a range of 5 to 30% by mass, and is more preferably in a range of 10 to 25% by mass relative to a total amount of the ink composition in view of maintaining the dispersion stability and providing the masking property to the composition.

The specific hollow particles exhibit a high level of masking property due to light scattering of the cavities therein, which is based on the shape thereof. Moreover, since the hollow particles have a specific gravity which is smaller than that of white inorganic pigments, the specific hollow particles can be stably present in a dispersion having a low viscosity. Since the specific hollow particle is an inorganic or an inorganic-organic hybrid particle, the hollow particles are excellent in dispersion stability in the ink composition, as well as the weather resistance and the heat resistance of a film (ink image) obtained after the ink composition is cured.

As described above, the ink composition of the invention is an ink composition which is excellent in dispersion stability of the pigment therein and which can give a film (ink image) excellent in weather resistance and heat resistance after the composition is cured; therefore, the pigment in the ink composition is effectively restrained from precipitating. As a result, when the ink composition is used in an inkjet device, the ink composition may not cause clogging of an inkjet nozzle. Furthermore, the composition is excellent in suitability for recording onto outdoor exhibitions, pottery and the like.

In the invention, one or more other white inorganic pigments may be used in addition to the specific hollow particles, as long as the advantageous effects of the invention are not impaired thereby.

Specific examples of the other white inorganic pigment include basic lead carbonate ($2PbCO_3 \cdot Pb(OH)_2$, known as "silver white"), zinc oxide (ZnO, known as "zinc white"), titanium oxide ($TiO_2$, known as "titanium white"), and strontium titanate ($SrTiO_3$, known as "titanium strontium white").

Titanium oxide has a specific gravity smaller than that of other white inorganic materials. Titanium oxide further has a refractive index larger than that of other white inorganic materials. Furthermore, titanium oxide is chemically and physically more stable than other white inorganic materials. Thus, titanium oxide as a pigment has high levels of masking property and coloring property, and also has excellent endurance against acid, alkali and other environments. Accordingly, the white inorganic pigment which may be used in addition to the specific hollow particle of the invention is preferably titanium oxide.

Titanium oxide is generally rarely used in an untreated state. Titanium oxide is generally used in a state pre-treated with silica, alumina, zinc, zirconia, an organic material or the like. The degree of weather resistance, the hydrophilic properties, and the lipophilic properties of the treated titanium oxide depend on the process of the treatment. Titanium oxide treated with alumina, zinc, zirconia, or a basic organic material is preferably used in the invention. In a case where titanium oxide which is treated with alumina, zinc, zirconia, or a basic organic material is used in the invention, it is preferable that the amount of titanium oxide treated with any one of these material is 50% or more relative to the total amount of titanium oxide used in the ink composition of the invention. Another white inorganic pigment, which may be a pigment other than the white pigments listed above, may also be used as necessary.

In the case where the specific hollow particles and one or more white inorganic pigments other than the specific hollow particles are used in combination as the white pigments in the invention, the ratio of the other white inorganic pigment is preferably 90% or less relative to the total amount of the pigments, and is preferably 80% relative to the total amount of the pigments from the viewpoint of dispersion stability.

For dispersing the pigment in the invention, any one of dispersing machines, such as ball mill, sand mill, attriter, roll mill, jet mill, homogenizer, paint shaker, kneader, agitator, Henschel mixer, colloid mill, ultrasonic wave homogenizer, pearl mill, and wet jet mill, may be used.

(b) Polymerizable Compound

The ink composition according to the invention contains a polymerizable compound. The polymerizable compound for use in the invention is not particularly limited as long as it is a polymerizable group-containing compound known in the art, and any one of known polymerizable compounds may be used without restriction, independently of whether it is a monomer, an oligomer, or a polymer. The polymerizable compounds may be used alone or in combination of two or more, for the purpose of adjusting the reaction rate, ink physical properties, physical properties of the cured film, and others.

The polymerizable compound used is preferably a radical polymerizable compound or a cationic polymerizable compound.

Radical Olymerizable Compound

The radical polymerizable compound is a compound having an ethylenic unsaturated bond capable of radical polymerization, and may be in any form as long as a molecule includes at least one ethylenic unsaturated bond capable of radical polymerization, including a chemical form such as a monomer, an oligomer, and a polymer. One kind of such radical polymerizable compound may be used, or, in order to improve a purposed property, two or more kinds thereof may be used at any ratio. Moreover, polyfunctional compounds having two or more functional groups are more preferred than monofunctional compounds. A combined use of two or more types of polyfunctional compounds is further preferred in controlling the performance such as reactivity and physical properties.

In the ink composition a radical polymerizable compound containing (meth)acrylate is preferably used as the radical polymerizable compound according to the invention. It is noted that the word "(meth)acrylate" referred in the specification comprises both acryl ate and methacrylate in its scope. Examples of the (meth)acrylates include the following compounds:

Specific examples of monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylates, alkoxyethyl (meth)acrylates, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth)acrylates, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth) acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethyleneoxide monomethylether (meth)acrylate, oligo ethyleneoxide monomethylether (meth)acrylates, polyethyleneoxide (meth)acrylate, oligo ethyleneoxide (meth)acrylates, oligo ethyleneoxide monoalkylether (meth)acrylates, polyethyleneoxide monoalkylether (meth)acrylates, dipropylene glycol (meth) acrylate, polypopyleneoxide monoalkylether (meth)acrylates, oligo propyleneoxide monoalkylether (meth)acrylates, 2-methacryloyloxyethyl succinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth) acrylate, 2-hydroxy-3-phenoxypropyl (meth)acrylate, ethyleneoxide-modified phenol (meth)acrylates, ethyleneoxide-modified cresol (meth)acrylates, ethyleneoxide-modified nonylphenol (meth)acrylates, polyethyleneoxide-modified nonylphenol (meth)acrylates, ethyleneoxide-modified-2-ethylhexyl (meth)acrylates, carbitol (meth)acrylate, oligoester (meth)acrylates, epoxy (meth)acrylates, urethane (meth) acrylates, methyl (meth)acrylate, n-butyl (meth)acrylate, 2-ethylhexyl (meth)acrylate, lauryl (meth)acrylate, allyl (meth)acrylate, glycidyl (meth)acrylate, benzyl (meth)acrylate, dimethylaminomethyl (meth)acrylate, and the like.

Specific examples of bifunctional (meth)acrylates include 1,6-hexanediol di(meth)acrylate, 1,10-decanediol di(meth) acrylate, neopentylglycol di(meth)acrylate, 2,4-dimethyl-1,5-pentanediol di(meth)acrylate, butylethylpropanediol (meth)acrylate, ethoxylated cyclohexane methanol di(meth) acrylates, polyethylene glycol di(meth)acrylate, oligo ethylene glycol di(meth)acrylates, ethylene glycol di(meth)acrylate, 2-ethyl-2-butyl-butanediol di(meth)acrylate, neopentyl hydroxypivalate glycol di(meth)acrylate, ethyleneoxide-modified bisphenol A di(meth)acrylates, bisphenol F polyethoxy di(meth)acrylates, polypropylene glycol di(meth) acrylate, oligo propylene glycol di(meth)acrylates, 1,4-butanediol di(meth)acrylate, 2-ethyl-2-butylpropanedial di(meth)acrylate, 1,9-nonane di(meth)acrylate, propoxylated ethoxylated bisphenol A di(meth)acrylates, tricyclodecane di(meth)acrylate, diethylene glycol di(meth)acrylate, triethylene glycol di(meth)acrylate, tetraethylene glycol di(meth) acrylate, polyethylene glycol di(meth)acrylate, 1,6-hexanediol di(meth)acrylate, ethylene glycol di(meth)acrylate, triethylene glycol di(meth)acrylate, polyethylene glycol di(meth)acrylate, polypropylene glycol di(meth)acrylate, and the like.

Specific examples of trifunctional (meth)acrylates include trimethylolpropane tri(meth)acrylate, trimethylolethane tri (meth)acrylate, alkyleneoxide-modified trimethylolpropane tri(meth)acrylates, pentaerythritol tri(meth)acrylate, dipentaerythritol tri(meth)acrylate, trimethylolpropane tri((meth) acryloyloxypropyl)ether, isocyanuric acid alkyleneoxide-modified tri(meth)acrylates, dipentaerythritol propionate tri (meth)acrylate, tri((meth)acryloyloxyethyl)isocyanurate, hydroxypivalaldehyde-modified dimethylolpropane tri (meth)acrylates, sorbitol tri(meth)acrylate, propoxylated trimethylolpropane tri(meth)acrylate, ethoxylated glycerin triacrylate, trimethylolethane tri(meth)acrylate, trimethylolpropane tri(meth)acrylate, and the like.

Specific examples of tetrafunctional (meth)acrylates include pentaerythritol tetra(meth)acrylate, sorbitol tetra (meth)acrylate, ditrimethyrollpropane tetra(meth)acrylate, dipentaerythritol propionate tetra(meth)acrylate, ethoxylated pentaerythritol tetra(meth)acrylate, dipentaerythritol tetra (meth)acrylate, tetramethylolmethane tetra(meth)acrylate, and the like.

Specific examples of pentafunctional (meth)acrylates include sorbitol penta(meth)acrylate, dipentaerythritol penta (meth)acrylate, and the like.

Specific examples of hexafunctional (meth)acrylates include dipentaerythritol hexa(meth)acrylate, sorbitol hexa (meth)acrylate, phosphazene alkyleneoxide-modified hexa (meth)acrylates, caprolactone-modified dipentaerythritol hexa(meth)acrylates, and the like.

In the invention, the radical polymerizable compound preferably contains (a) at least one trifunctional or higher (meth) acrylate and at least one compound selected from (b) a monofunctional (meth)acrylate and a bifunctional (meth)acrylate, for adjustment of viscosity, crosslinking density, and physical properties (strength, adhesiveness, and others) after curing. In such a case, the blending ratio (molar ratio) of (a):(b) is preferably 15:85 to 40:60 and more preferably 20:80 to 50:50.

Examples of the radical polymerizable compound other than those listed above include unsaturated carboxylic acids such as acrylic acid, methacrylic acid, itaconic acid, crotonic acid, isocrotonic acid, and maleic acid and the salts, esters, urethanes, amides and anhydrides thereof; acrylonitrile, styrene, as well as various unsaturated polyesters, unsaturated polyethers, unsaturated polyamides, unsaturated urethanes, and the like. Specific examples thereof include acrylic acid compounds such as bis(4-acryloxypolyethoxyphenyl)propane and diacetone acrylamide; methacrylic acid compounds such as 2,2-bis(4-methacryloxypolyethoxyphenyl)propane; and allyl compounds such as allyl glycidylether, diallyl phthalate, and triallyl trimellitate; and the like; and more specific examples include commercially available radical-polymerizable or crosslinkable monomers, oligomers and polymers known in the art, such as those described in "Crosslinking Agent Handbook" (Shinzo Yamashita Ed., 1981, Taiseisha Co., Ltd.), "UV-EB Curing Handbook (raw materials)" (Kiyoshi Kato Ed., Kobunshi Kankokai (1985)), "Application and Market of UV-EB Curing Technology" (RadTech Japan Ed., p. 79 (1989), CMC Publishing), "Polyester Resin Handbook" (Eiichiro Takiyama, Nihon Kogyo Shimbun (1988)).

The content of the radical polymerizable compound in the ink composition is preferably in a range of 5 to 95 wt %, more preferably in a range of 10 to 90 wt %, and particularly preferably in a range of 50 to 90 wt %, with respect to the total amount of the ink composition.

Cationic Polymerizable Compound

The cationic polymerizable compound may be selected arbitrarily, for the purpose of adjustment of the polymerizability and the physical properties of ink composition. Oxirane compounds, oxetane compounds, vinylethers, styrenes, and the like are preferable from the viewpoints of polymerization rate and application. These compounds may be used alone or in combination of two or more. Hereinafter, examples of these compounds are described.

Oxirane Compound

Examples of the oxirane compounds include aromatic epoxides, alicyclic epoxides, and the like.

Examples of the aromatic epoxides include di- or poly-glycidyl ethers prepared by allowing a polyvalent phenol having at least one aromatic ring or the alkyleneoxide adduct thereof to react with epichlorohydrin; and examples thereof include di- or poly-glycidyl ethers of bisphenol A or the alkyleneoxide adduct thereof, di- or poly-glycidyl ethers of a hydrogenated bisphenol A or the alkyleneoxide adduct thereof, novolak epoxy resins, and the like. Examples of the alkyleneoxide include ethyleneoxide, propyleneoxide, and the like.

Examples of the alicyclic epoxide include compounds including cyclohexeneoxide or cyclopenteneoxide obtained by epoxidizing a compound having at least one cycloalkane ring such as a cyclohexene or cyclopentene ring with a proper oxidizer such as hydrogen peroxide, or peroxy acid.

Examples of the aliphatic epoxide include diglycidylether or polyglycidylether of aliphatic polyalcohol or its alkyleneoxide adduct. Specific examples thereof include diglycidylether of alkyleneglycol such as diglycidylether of ethyleneglycol, diglycidylether of propyleneglycol, diglycidylether of 1,6-hexanediol, polyglycidylether of polyalcohol such as diglycidylether or triglycidylether of glycerin or its alkyleneoxide adduct, diglycidylether of polyalkyleneglycol such as diglycicylether of polyethyleneglycol or its alkyleneoxide adduct, diglycidylether of polypropyleneglycol or its alkyleneoxide adduct. Here, examples of the alkyleneoxide include ethyleneoxide and propyleneoxide.

Among the epoxy compounds, from the viewpoint of rapid curability, preferred are the aromatic epoxide and the alicyclic epoxide, in particular, the alicyclic epoxide.

Oxirane compounds having fewer functional groups, which also allow adjustment of solubility and viscosity as described above, are preferable.

Specific examples of the oxirane compounds for use in the invention include the followings: Examples of monofunctional epoxide include as phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cyclohexeneoxide, 3-methacryloyloxymethylcyclohexeneoxide, 3-acryloyloxymethylcyclohexeneoxide, 3-vinylcylcohexeneoxide, and the like.

Examples of multifunctional epoxides include bisphenol A diglycidylether, bisphenol F diglycidylether, bisphenol S diglycidylether, brominated bisphenol A diglycidylethers, brominated bisphenol F diglycidylethers, brominated bisphenol S diglycidylethers, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl) adipate, vinylcylcohexeneoxide, 4-vinyl epoxycyclohexane, bis(3,4-epoxy-6-methylcyclohexylmethyl) adipate, 3,4-epoxy-6-methylcyclohexyl-3,4'-epoxy-6'-methylcyclohexane carboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), dioctyl epoxyhexahydrophthalate, di-2-ethylhexyl epoxyhexahydrophthalate, 1,4-butanediol diglycidylether, 1,6-hexanediol diglycidylether, glycerin triglycidylether, trimethylolpropane triglycidylether, polyethylene glycol diglycidylether, polypropylene glycol diglycidylethers, 1,1,3-tetradecadiene dioxide, limonene dioxide, 1,2,7,8-diepoxyoctane, 1,2,5,6-diepoxycyclooctane, and the like.

Oxetane Compound

The oxetane compound according to the invention is a compound having an oxetane ring, and any one of known oxetane compounds such as those described in JP-A Nos. 2001-220526, 2001-310937, and 2003-341217 may be used.

The oxetane ring-containing compound for use in the ink composition according to the invention is preferably a compound having 1 to 4 oxetane rings in the structure, and among them, use of a compound having one oxetane ring is preferable from the viewpoints of the viscosity and tackiness of the ink composition. It becomes possible to keep the viscosity of the ink composition in the range favorable for handling and make the cured ink more adhesive to the recording medium by using such a compound.

Specific examples of the monofunctional oxetane compounds for use in the invention include 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenylether, isobutoxymethyl (3-ethyl-3-oxetanylmethyl)ether, isobornyloxyethyl (3-ethyl-3-oxetanylmethyl)ether, isobornyl (3-ethyl-3-oxetanylmethyl)ether, 2-ethylhexyl (3-ethyl-3-oxetanylmethyl)ether, ethyldiethylene glycol (3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl)ether, tetrabromophenyl (3-ethyl-3-oxetanylmethyl)ether, 2-tetrabromophenoxyethyl (3-ethyl-3-oxetanylmethyl)ether, tribromophenyl (3-ethyl-3-oxetanylmethyl)ether, 2-tribromophenoxyethyl (3-ethyl-3-oxetanylmethyl)ether, 2-hydroxyethyl (3-ethyl-3-oxetanylmethyl)ether, 2-hydroxypropyl (3-ethyl-3-oxetanylmethyl)ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, bornyl (3-ethyl-3-oxetanylmethyl)ether, and the like.

Examples of the multifunctional oxetane compounds for use in the invention include 3,7-bis(3-oxetanyl)-5-oxa-nonane, 3,3'-[1,3-(2-methylenyl)propanediyl bis(oxymethylene)]bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecandiyldimethylene (3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ethers, caprolactone-modified dipentaerythritol pentakis(3-ethyl-3-oxetanylmethyl)ethers, ditrimethyrollpropane tetrakis(3-ethyl-3-oxetanylmethyl)ether, EO-modified bisphenol A bis(3-ethyl-3-oxetanylmethyl) ethers, PO-modified bisphenol A bis(3-ethyl-3-oxetanylmethyl)ethers, EO-modified hydrogenated bisphenol A bis(3-ethyl-3-oxetanylmethyl)ethers, PO-modified hydrogenated bisphenol A bis(3-ethyl-3-oxetanylmethyl)ethers, and EO-modified bisphenol F (3-ethyl-3-oxetanylmethyl)ethers, and the like.

Vinyl Ethers

Examples of monofunctional vinyl ethers among the vinylethers above include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinylether, methoxyethyl vinylether, ethoxyethyl vinylether, butoxyethyl vinylether, methoxyethoxyethyl vinylether, ethoxyethoxyethyl vinylether, methoxypolyethylene glycol vinylether, tetrahydrofurfuryl vinylether, 2-hydroxyethyl vinylether, 2-hydroxypropyl vinylether, 4-hydroxybutyl vinylether, 4-hydroxymethylcyclohexylmethyl vinylether, diethylene glycol monovinylether, polyethylene glycol vinylether, chloroethyl vinylether, chlorobutyl vinylether, chloroethoxyethyl vinylether, phenylethyl vinylether, phenoxypolyethylene glycol vinylether, and the like.

Examples of multifunctional vinyl ethers include divinyl ethers such as ethylene glycol divinylether, diethylene glycol divinylether, polyethylene glycol divinylether, propylene glycol divinylether, butylene glycol divinylether, hexanediol divinylether, bisphenol A alkyleneoxide divinylethers, and bisphenol F alkyleneoxide divinylethers; multifunctional vinylethers such as trimethylolethane trivinylether, trimethylolpropane trivinylether, ditrimethylolpropane tetravinylether, glycerin trivinylether, pentaerythritol tetravinylether, dipentaerythritol pentavinylether, dipentaerythritol hexavinylether, ethyleneoxide adducts of trimethylolpropane trivinylether, propyleneoxide adducts of trimethylolpropane trivinylether, ethyleneoxide adducts of ditrimethyrollpropane tetravinylether, propyleneoxide adducts of ditrimethyrollpropane tetravinylether, ethyleneoxide adducts of pentaerythritol tetravinylether, propyleneoxide adducts of pentaerythritol tetravinylether, ethyleneoxide adducts of dipentaerythritol hexavinylether, propyleneoxide adducts of dipentaerythritol hexavinylether, and the like.

Styrenes

Specific examples of the styrenes include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, alkylstyrene, isopropenyistyrene, butenylstyrene, octenylstyrene, 4-t-butoxycarbonylstyrene, 4-methoxystyrene, 4-t-butoxystyrene, and the like.

In the invention, the ink composition preferably contains at least one compound selected from the oxirane compounds and the oxetane compounds above as the cationic polymerizable compound, from the viewpoint of curing speed. In such a case, the blending ratio (molar ratio) of oxirane compound: oxetane compound is preferably 90:10 to 10:90 and more preferably 70:30 to 30:70. Use of an oxetane compound and styrene at a blending ratio of 90:10 to 50:50 can be also preferable.

The content of the cationic polymerizable compound in the ink composition is preferably 5 to 95 wt %, more preferably 10 to 90 wt %, and particularly preferably 50 to 90 wt %, with respect to the total amount of the ink composition.

Polymerization Initiator

The ink composition according to the invention contains a polymerization initiator. Any one of known compounds that can harden the polymerizable compound may be used as the polymerization initiator.

Examples of the polymerization initiator include radical polymerization initiators and cationic polymerization initiators, and is preferably selected in consideration of a relationship with the polymerizable compound.

Photo Acid Generator

The ink composition according to the invention preferably contains a photo acid generator as the polymerization initiator. The photo acid generator is a compound that generates an acid by irradiation of activated light or active radiation ray and initiates cationic polymerization, and is used as it is selected properly from known compounds and the mixture thereof.

The photocationic polymerization initiators including those described below and may be used alone or in combination of two or more thereof.

The content of the photo acid generator in the ink composition is preferably in the range of 0.1 to 20 wt % and more preferably 0.5 wt % to 10 wt %. A photo acid generator content of 0.1% or less may lead to decrease in the amount of the acid generated and thus to insufficient curing efficiency, while a photo acid generator content of 20% or more may cause problems of the brittleness of cured product and acid generation by remaining initiator.

Examples of the photo acid generator according to the invention include diazonium salts, phosphonium salts, sulfonium salts, iodonium salts, imide sulfonates, oxime sulfonates, diazo disulfones, disulfones, and o-nitrobenzylsulfonates.

Alternatively, polymer compounds containing the photo acid generator, a group having an effect which is equivalent to that of the photo acid generator, or a compound having an effect which is equivalent to that of the photo acid generator on its main or side chain, such as those described in U.S. Pat. No. 3,849,137, Germany Patent No. 3914407, JP-A Nos. 63-26653, 55-164824, 62-69263, 63-146038, 63-163452, 62-153853, and 63-146029, and others, may also be used.

The compounds that generate an acid by light irradiation described in U.S. Pat. No. 3,779,778, and EP Patent No. 126,712 may be also favorably used.

Radical Polymerization Initiator

The radical polymerization initiators in the invention are preferably used alone or in combination of two or more thereof. Preferable examples of the radical polymerization initiator that can be used in the invention include (a) aromatic ketones, (b) aromatic onium salt compounds, (c) organic peroxides, (d) thio compounds, (e) hexaaryl biimidazole compounds, (f) ketoxime ester compounds, (g) borate compounds, (h) azanium compounds, (i) metallocene compounds, (j) active ester compounds, (k) compounds having a carbon-halogen bond, and (i) alkylamine compounds. The compounds (a) to (l) may be used singly or in combination of two or more thereof as the radical polymerization initiator(s).

(d) Sensitizing Dye

It is allowable to incorporate a (d) sensitizing dye into the ink composition of the invention in order to promote the decomposition of the (c) polymerization initiator by irradiation with an active light ray. The sensitizing dye absorbs a specific active radiation ray so as to be in an electron excited state. The sensitizing dye in the electron excited state contacts the polymerization initiator to cause effects such as electron-transferring, energy-shift, heat generation or the like, thereby promoting a chemical change of the polymerization initiator, that is, decomposition thereof, generation of a radical, an acid or a base therefrom, or the like.

The sensitizing dye may be any compound as long as it corresponds to a wavelength of the active radiation ray which causes the (c) polymerization initiator used in the ink composition to generate an initiating species. Considering that the polymerization initiator is used for generally-known curing reactions of ink compositions, preferable examples of the sensitizing dye include compounds which belong to any one of compound groups described below and have an absorption wavelength which is in a range of 350 to 450 nm.

Namely, preferable examples of the sensitizing dye include a polynuclear aromatic compound (such as anthracene, pyrene, perylene or triphenylene), a thioxanthone compound (such as isopropylthioxanthone), a xanthene compound (such as fluorescein, eosin, erythrosine, rhodamine B, or rose bengal), a cyanine compound (such as thiocarbocyanine or oxacarbocyanine), a merocyanine compound (such as merocyanine or carbomerocyanine), a thiazine compound (such as thionin, methylene blue, or toluidine blue), an acridine compound (such as acridine orange, chloroflavon, or acriflavine), an anthraquinone compound (such as anthraquinone), a squarylium compound (such as squarylium), and a coumalin compound (such as 7-diethylamino-4-methylcoumalin). Among these, the polynuclear aromatic compound and the thioxanthone compound are particularly preferable.

More preferred examples of the sensitizing dye include compounds represented by any one of the following Formulae (I) to (V):

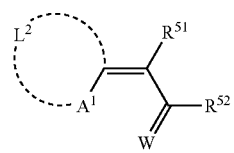

In Formula (I), $A^1$ represents a sulfur atom or $NR^{50}$, in which $R^{50}$ represents an alkyl group or an aryl group; $L^2$ represents a non-metallic atomic group which is combined with $A^1$ adjacent thereto and the carbon atom adjacent thereto to form a basic nucleus of the dye; each of $R^{51}$ and $R^{52}$ independently represents a hydrogen atom or a monovalent non-metallic atomic group; $R^{51}$ and $R^{52}$ may be bonded with each other to form an acidic nucleus of the dye; and W represents an oxygen atom or a sulfur atom.

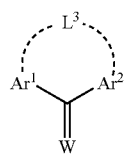

In Formula (II), each of $Ar^1$ and $Ar^2$ independently represents an aryl group, and $Ar^1$ and $Ar^2$ are linked with each other through bonds of $-L^3-$, in which $L^3$ represents —O— or —S—; and W represents an oxygen atom or a sulfur atom.

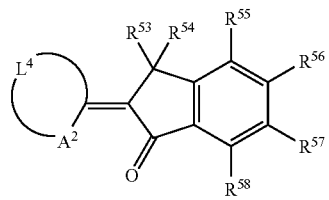

In Formula (III), $A^2$ represents a sulfur atom or $NR^{59}$, in which $R^{59}$ represents an alkyl group or an aryl group; $L^4$ represents a non-metallic atomic group which is combined with $A^2$ adjacent thereto and the carbon atom adjacent thereto to form a basic nucleus of the dye; and each of $R^{53}$ to $R^{58}$ independently represents a monovalent non-metallic atomic group.

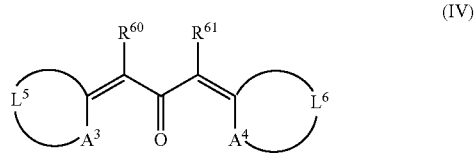

In Formula (IV), each of $A^3$ and $A^4$ independently represents —S—, —$NR^{62}$ or $NR^{63}$, in which each of $R^{62}$ and $R^{63}$ independently represents a substituted or unsubstituted alkyl group, or a substituted or unsubstituted aryl group; each of $L^5$ and $L^6$ independently represents a non-metallic atomic group which is combined with $A^3$ or $A^4$ adjacent thereto and the carbon atom adjacent thereto to form a basic nucleus of the dye; and each of $R^{60}$ and $R^{61}$ independently represents a hydrogen atom or a monovalent non-metallic atomic group, or $R^{60}$ and $R^{61}$ are bonded with each other to form an aliphatic ring or an aromatic ring.

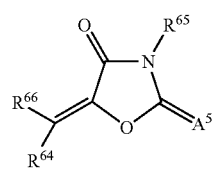

In Formula (V), $R^{66}$ represents an aromatic ring or a heteroring, each of which may have a substituent; $A^5$ represents an oxygen atom, a sulfur atom, or =$NR^{67}$; $R^{64}$, $R^{65}$ and $R^{67}$ each independently represents a hydrogen atom or a monovalent non-metallic atomic group; and each of the combinations of $R^{67}$ and $R^{64}$ and $R^{65}$ and $R^{67}$ may be bonded with each other to form an aliphatic ring or an aromatic ring.

Preferable specific examples of the compounds represented by any one of the Formulae (I) to (V) include the following compounds (E-1) to (E-20).

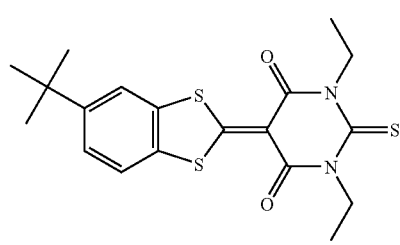

(E-1)

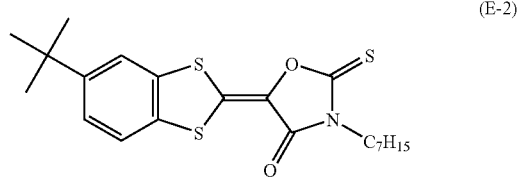

(E-2)

(E-3) 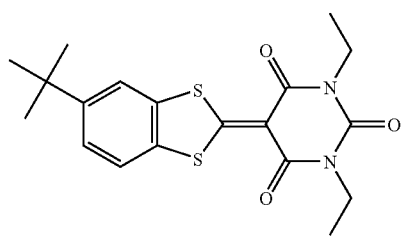
(E-4) 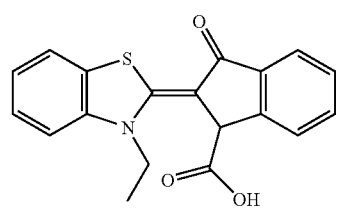
(E-5) 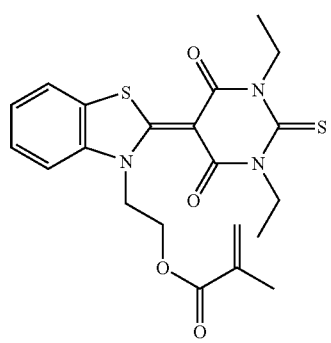
(E-6) 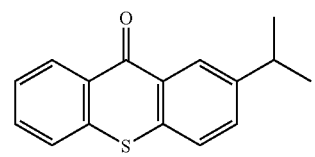
(E-7) 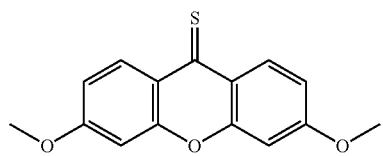
(E-8) 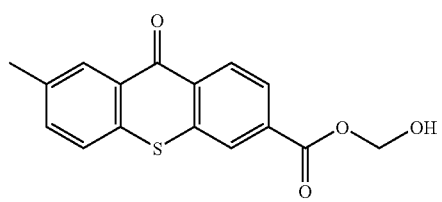
(E-9) 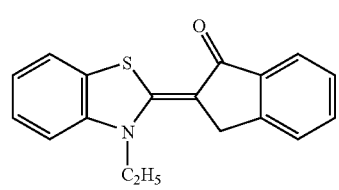
(E-10) 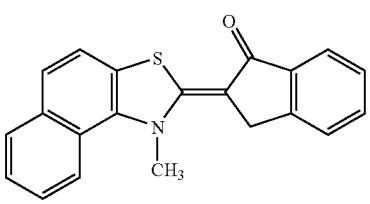
(E-11) 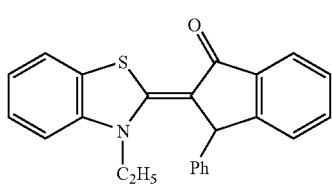
(E-12) 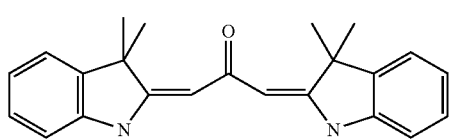
(E-13) 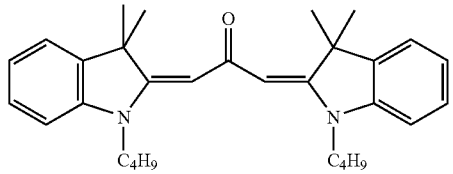
(E-14) 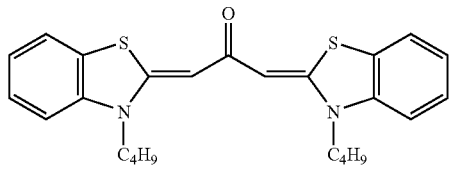
(E-15) 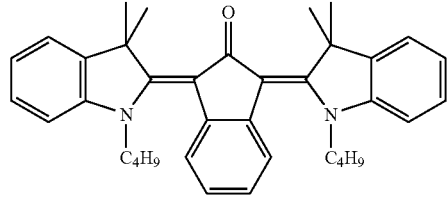
(E-16) 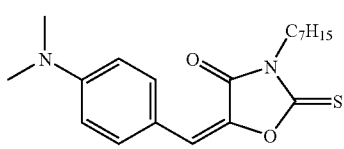
(E-17) 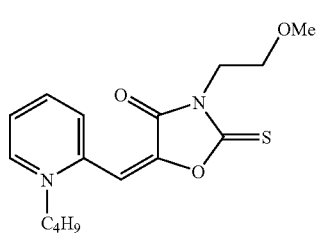

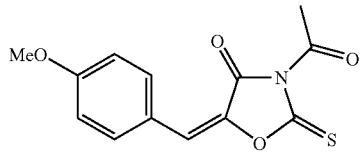

(E-18)

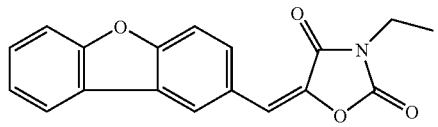

(E-19)

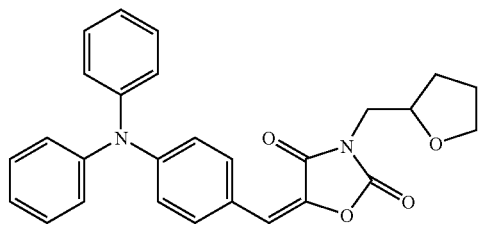

(E-20)

(e) Cosensitizer

The ink composition of the invention may further contain a cosensitizer. The cosensitizer in the invention has effects of improving the sensitivity of the sensitizing dye to the active radiation ray, restraining oxygen from hindering the polymerization of the polymerizable compound, or the like.

Examples of the cosensitizer include amines such as compounds described in M. R. Sander et al., "Journal of Polymer Society", vol. 10, 3173 (1972), Japanese Patent Application Publication (JP-B) No. 44-20189, JP-A Nos. 51-82102, 52-134692, 59-138205, 60-84305, 62-18537 and 64-33104, or Research Disclosure No. 33825. Specific examples thereof include triethanolamine, ethyl p-dimethylaminobenzoate, p-formyldimethylaniline, and p-methylthiodimethylaniline.

Examples of the cosensitizer further include thiols and sulfides such as thiol compounds described in JP-A Nos. 53-702 and 5-142772 and JP-B No. 55-500806, or disulfide compounds described in JP-A No. 56-75643. Specific examples thereof include 2-mercaptobenzothiazole, 2-mercaptobenzoxazole, 2-mercaptobenzimidazole, and 2-mercapto-4(3H)-quinazoline, and β-mercaptonaphthalene.

Examples of the cosensitizer furthermore include amino acid compounds (such as N-phenylglycine), organometallic compounds described in JP-B No. 48-42965 (such as tributyltin acetate), hydrogen donors described in JP-B No. 55-34414, sulfur compounds described in JP-A No. 6-308727 (such as trithiane), phosphorus compounds described in JP-A No. 6-250387 (such as diethyl phosphate), and Si—H and Ge—H compounds described in JP-A No. 8-65779.

Dispersing Medium

A solvent may be added to the ink composition of the invention as a medium for dispersing the pigment and other various components. In a case where the ink composition of the invention is prepared by a system to which no solvent is added, the above-mentioned polymerizable compound, which is a low molecular weight component, may be used as a dispersing medium.

The ink composition according to the invention is a radiation-curing ink that cures after application onto a recording medium. Accordingly, the ink composition preferably contains no solvent. This is because solvent remaining in the cured ink image causes deterioration in solvent resistance and a problem associated with VOC's (Volatile Organic Compounds) derived from the residual solvent.

In consideration of these, it is preferable to use a polymerizable compound as the dispersing medium. In consideration of the dispersing suitability and improvement in the handling property of the ink composition, it is particularly preferable to use a polymerizable compound which has the lowest viscosity among those applicable in respective embodiment of the ink composition of the invention.

Macromolecular Dispersing Agent

The ink composition of the invention preferably contains a macromolecular dispersing agent. In a non-aqueous dispersion system, dispersion stabilization based on steric repulsion is effective. Thus, when a macromolecular compound is used as a dispersing agent, a high dispersion stability can be obtained. Since there is a fear that the macromolecular dispersing agent causes an increase in the viscosity of the ink composition, it is desired that the macromolecular dispersing agent is effectively adsorbed onto the pigment and the power thereof to be absorbed to the pigment is strong. However, since a macromolecular dispersing agent generally has a poor efficiency of being adsorbed to pigments, and the power thereof to be absorbed to pigments is weak, the use amount thereof becomes large, which may cause undesirable accompanied effects such as increase in viscosity.

The kind of the macromolecular dispersing agent (polymer compound) that is used in the invention needs to be selected in accordance with the surface charge of the used hollow particles. Mutual interactions of acid and base are important for dispersing an inorganic pigment. When a particle surface has a positive charge, it is preferable to use a dispersing agent having negative charges. Conversely, when a particle surface has a negative charge, it is advisable to use a dispersing agent having electrostatic charges.

The macromolecular dispersing agent that can be used in the invention may be selected from known dispersing agents.

Examples of the macromolecular dispersing agent having a positive charge include compounds each having, as a functional group, a primary, secondary or tertiary amino group, or a nitrogen-containing heterering such as pyridine, pyrimidine, or pyrazine.

Examples of the dispersing agent having a negative charge include compounds each having, as a functional group, a carboxylic acid, a phosphonic acid or a sulfonic acid.

While specific examples thereof include AZISPER series (trade name, manufactured by Ajinomoto Fine-Techno Co. Inc.), SOLSPERSE series (trade name, manufactured by Avecia Ltd., DISPER BIC series manufactured by BYK-Chemie Co.), and DISPALON series (trade name, manufactured by Kusumoto Chemicals Ltd), the macromolecular dispersing agent is not limited thereto.

The addition amount of the macromolecular dispersing agent for use in the invention is preferably in the range of 0.1 to 10 wt % and more preferably in the range of 1 to 4 wt % with respect to the amount of the white pigment. When the addition amount of the macromolecular dispersing agent is in the range of 0.1 to 10 wt % with respect to the amount of the white pigment, the macromolecular dispersing agent is adsorbed more on the pigment and dispersed better, leaving the viscosity of the ink composition unincreased by the polymer compound, preventing increase in the surface tension of the ink composition by action of surfactant, and eliminating inkjet ejection troubles.

In addition, the macromolecular dispersing agent for use in the invention should be soluble in the dispersion medium such as a polymerizable compound. When the macromolecular dispersing agent is used without being dissolved, the macromolecular dispersing agent may be insufficiently adsorbed on the pigment, occasionally causing insufficient dispersion.

Other Components

Hereinafter, various additives that may be added as need to the ink composition according to the invention will be described.

Polymerization Inhibitor

It is preferable in the invention to use a polymerization inhibitor for preventing polymerization other than cationic polymerization, to make the polymerization by the photocationic polymerization initiator proceed more efficiently. The suitable polymerization inhibitor is a compound selected from the group consisting of phenolic hydroxyl group-containing compounds and quinones, N-oxide compounds, piperidin-1-oxyl free radical compounds, pyrrolidin-1-oxyl free radical compounds, N-nitroso phenyl hydroxylamines, and cationic dyes. Favorable examples of the polymerization inhibitors include hydroquinone, p-methoxyphenol, di-t-butyl-p-cresol, pyrogallol, resorcinol, catechol, t-butylcatechol, hydroquinone, benzoquinone, 4,4-thiobis(3-methyl-6-t-butylphenol), 2,2'-methylene-bis(4-methyl-6-t-butylphenol), 2,2,6,6-tetramethylpiperidine and modified compounds thereof, di-t-butyl nitroxide, 2,2,6,6-tetramethylpiperidine-N-oxide and modified compounds thereof, piperidin-1-oxyl free radical, 2,2,6,6-tetramethylpiperidin-1-oxyl free radical, 4-oxo-2,2,6,6-tetramethylpiperidin-1-oxyl free radical, 4-hydroxy-2,2,6,6-tetramethylpiperidin-1-oxyl free radical, 4-acetamido-2,2,6,6-tetramethylpiperidin-1-oxyl free radical, 4-maleimido-2,2,6,6-tetramethylpiperidin-1-oxyl free radical, 4-phosphonoxy-2,2,6,6-tetramethylpiperidin-1-oxyl free radical, 3-carboxy-2,2,5,5-tetramethylpyrrolidin-1-oxyl free radical, N-nitrosophenylhydroxylamine cerous salt, N-nitrosophenylhydroxylamine aluminum salt, crystal violet, methyl violet, ethyl violet, Victoria Pure Blue BOH, and the like. The amount of the polymerization inhibitor added is preferably 0.01 to 5 wt %, with respect to the total mass of the ink composition.

Ultraviolet Absorber

An ultraviolet absorber may be added to the ink composition of the present invention from the viewpoint of improving the weather resistance and preventing discoloration of the obtained image.

Examples of the ultraviolet absorber include benzotriazol compounds described in JP-A Nos. 58-185677, 61-190537, 2-782, 5-197075 and 9-34057; benzophenone compounds described in JP-A Nos. 46-2784 and 05-194483, and U.S. Pat. No. 3,214,463; cinnamic acid compounds described in Japanese Patent Application Publication (JP-B)Nos. 48-30492 and 56-21141, and JP-A No. 10-88106; triazine compounds described in JP-A Nos. 4-298503, 8-53427, 8-239368, and 10-182621, and Japanese National Phase Publication No. 8-5012911, compounds described in Research Disclosure No. 24239; compounds which absorb ultraviolet rays to generate fluorescence, such as stilbene and benzoxazol compounds; and so-called fluorescent brightening agents.

While the addition amount may vary accordingly to applications, it is usually approximately in a range of 0.01 to 10 wt % relative to a total mass of the ink composition.

Antioxidant

An antioxidant may be added to the ink composition of the present invention in order to improve the stability. Examples of the anti-oxidant include ones described in European Patent Publication Nos. 223739, 309401, 309402, 310551, 310552, and 459416, German Patent Publication No. 3435443, JP-A Nos. 54-48535, 62-262047, 63-113536, and 63-163351, 02-262654, 02-71262, 03-121449, 05-61166, 05-119449, U.S. Pat. Nos. 4,814,262, and 4,980,275.

While the addition amount may vary accordingly to applications, it is usually approximately in a range of 0.001 to 1 wt % relative to a total mass of the ink composition.

Solvent

In order to improve the adhesiveness onto the recording medium, it is also effective to add trace amount of organic solvent into the ink composition of the present invention.

Examples of the solvent include: ketone solvents such as acetone, methylethyl ketone, diethyl ketone, cyclohexanone; alcohol solvents such as methanol, ethanol, 2-propanol, 1-propanol, 1-butanol, and tert-butanol; chlorinated solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycolether solvents such as ethylene glycol monomethylether and ethylene glycol dimethylether.

In this case, the effective addition is within a range not causing problems such as solvent resistance and VOC. The amount thereof is preferably within a range of 0.1 to 5 wt %, more preferably 0.1 to 3 wt % relative to a total mass of the ink composition.

Polymer Compound

Various other polymer compounds for adjustment of film physical properties may be added additionally to the ink composition according to the invention. Examples of the other polymer compounds include styrene polymers, acrylic polymers, cyclic ether polymers, polyvinylbutyral resins, polyurethane resins, polyamide resins, polyester resins, epoxy resins, phenol resins, polycarbonate resins, polyvinylbutyral resins, polyvinyl formal resins, shellac, vinyl resins, acrylic resins, rubber-based resins, waxes, other natural resins, and the like. These polymer compounds may be used in combination of two or more. Among them, copolymers of a styrene monomer, an acrylic monomer, and a cyclic ether are preferable. In addition, copolymers containing a "cyclic ether group-containing monomer" or a "vinylether group-containing monomer" as its structural unit are also used favorable as the copolymerization component of polymer binder.

While the addition amount may vary according to applications, it is usually approximately 0.01 to 10.0 wt % relative to a total mass of the ink composition.

Surfactant

In order to adjust the surface tension and to improve discharging property of the inkjet-recording ink, a surfactant may be added to the ink composition of the present invention. Examples of the surfactant include those described in JP-A Nos. 62-173463 and 62-183457. Examples thereof include: anionic surfactants such as dialkyl sulfosuccinates, alkyl naphthalenesulfonates, and fatty acid salts; nonionic surfactants such as polyoxyethylene alkyl ethers, polyoxyethylene alkyl aryl ethers, acetylenic glycols, and polyoxyethylene/polyoxypropylene block copolymers; and cationic surfactants such as alkylamine salts, and quaternary ammonium salts. An organic fluoro compound may be used instead of the surfactant above. The organic fluoro compound is preferably hydrophobic. Examples of the organic fluoro compound include fluorine-containing surfactants, oily fluorine-containing compounds (such as fluorine oil), and fluorine-containing solid resins (such as ethylene tetrafluoride resin). The organic fluoro compounds are described in JP-B No. 57-9053 (column 8 to 17), and JP-A No. 62-135826.

While the addition amount may vary according to applications, it is usually approximately in a range of 0.001 to 5.0 wt % relative to a total mass of the ink composition.

In addition, leveling addition agents, matting agents, waxes for adjusting the film property, and a tackifier which does not inhibit the polymerization to improve the adhesiveness onto the recording medium such as polyolefin or PET may be added to the inkjet recording ink of the present invention as necessary.

Specific example of the tackifier include cohesive polymers of high molecular weight described in JP-A No. 2001-49200, page 5 to 6 (for example, a copolymer comprising an ester of (meth)acrylate and alcohol including an alkyl group having 1 to 20 carbon atoms, an ester of (meth)acrylate and alicyclic alcohol having 3 to 14 carbon atoms, and an ester of (meth)acrylate and aromatic alcohol having 6 to 14 carbon atoms), and tackifying resins of low molecular weight having a polymerizable unsaturated bond.

Considering the ejection efficiency when applied to inkjet-recording, the ink composition according to the invention preferably has an ink viscosity of 50 mPa·s or less, more preferably 30 mPa·s or less, at the ejection temperature, and thus, it is preferable to adjust and determine the ink composition properly so that the viscosity thereof falls in the range above. The viscosity of the ink composition at 25° C. is 10 to 300 mPa·s and preferably 10 to 100 mPa·s. By setting the viscosity high at room temperature, it become possible to prevent penetration of the ink into recording medium even when a porous recording medium is used, reduce the amounts of uncured monomer and odor, suppress ink bleeding after an ink droplet is ejected, and consequently improve the quality of the resulting image. An ink viscosity of lower than 10 mPa·s at 25° C. may not be effective in preventing the ink bleeding, while an ink viscosity of more than 500 mPa·s may lead to a problem in ink delivery.

The surface tension of the ink composition of the present invention is preferably 20 to 30 mN/m, more preferably 23 to 28 mN/m. If recording is performed onto various recording media such as polyolefin, PET, a coated paper, and an uncoated paper, the surface tension is preferably 20 mN/m or more from the viewpoint of bleeding and permeation, and preferably 30 mN/m or less from the viewpoint of wettability.

The ink composition according to the invention can be used favorably as an ink for inkjet-recording. The inkjet-recording process is not particularly limited, and may be, for example, an electric charge-control method of ejecting ink by electrostatic attraction, a drop-on-demand method (pressure pulse method) of using the vibrational pressure of piezoelectric element, an acoustic inkjet method of ejecting ink by converting electrical signals into acoustic beams, irradiating the beams on ink, and generating an acoustic radiation pressure in the ink, a thermal inkjet method of forming air bubbles by heating ink and using the pressure thus generated, or the like. The inkjet-recording processes include those of ejecting a so-called photo ink, which is lower in concentration, multiple times in smaller volumes, improving image quality by using multiple different inks that are substantially the same in color tone and concentration, and using a transparent and colorless ink. Among them, the ink composition according to the invention is favorable as the ink for printing by a drop-on-demand process (pressure pulse process) using an piezoelectric element.

The ink composition of the invention is an ink composition curable by a radial-ray. The composition is cured by irradiation with an active radiation ray.

Examples of the active radiation ray include α-rays, β-rays, electron beams, X-rays, ultraviolet rays, visible rays and infrared rays. The peak wavelength of the active radiation ray depends on the absorption property of the sensitizing dye, and typically, the peak wavelength is preferably in a range of 200 to 600 nm, more preferably in a range of 300 to 450 nm, even more preferably in a range of 350 to 420 nm.

The polymerization initiating system of the ink composition of the invention has a sufficient sensitivity even if a low-power active radiation ray is used therefor. Accordingly, the power of the active radiation ray is preferably 2,000 mJ/cm$^2$ or less, more preferably in a range of 10 to 2,000 mJ/cm$^2$, even more preferably in a range of 20 to 1,000 mJ/cm$^2$, and particularly preferably in a range of 50 to 800 mJ/cm$^2$.

The active radiation ray is radiated to give a light-radiated face illuminance which is typically in a range of 10 to 2,000 mW/cm$^2$, and which is preferably in a range of 20 to 1,000 mW/cm$^2$.

Mercury lamps, gas lasers, solid lasers or the like are conventionally mainly used as a source for the active radiation ray. Mercury lamps and metal halide lamps are well-known as a light source used to cure an ultraviolet curable inkjet recording ink. Despite of such circumstances, it is currently intensely desired to avoid using mercury for the protection of environment. Thus, it is very useful for industries and environment to use a GaN semiconductor ultraviolet emitting device in place of the mercury lamps. Further, an LED (UV-LED) and an LD (UV-LD) are each expected as a light source for light curable inkjet ink since they are small-sized and inexpensive and have a long lifespan and a high efficiency.

The LED (light emitting diode) and the LD (laser diode) can be used as a source of the active radiation ray. In particular, when an ultraviolet ray source is required, an ultraviolet LED or an ultraviolet LD can be used. For example, an ultraviolet LED having a main emission spectrum wavelength in the range of 365 to 420 nm is commercially available from Nichia Chemical Industries, Ltd. Examples of a light source providing a still shorter wavelength include an LED that is disclosed in U.S. Pat. No. 6,084,250 and can emit an active radiation ray the central wavelength of which is in the range of 300 to 370 nm. Other ultraviolet LEDs are also available, and thus radiations having ultraviolet which is in different bands can be emitted. Specifically preferable example of the active radiation ray source in the invention include a UV-LED. The peak wavelength thereof is particularly preferably in a range of 350 to 420 nm.

The maximum illuminance of light from the used LED on a medium on which recording is to be attained (i.e., a recording medium) is preferably in a range of 10 to 2,000 mW/cm$^2$, more preferably in a range of 20 to 1,000 mW/cm$^2$, even more preferably in a range of 50 to 800 mW/cm$^2$.

A time length of irradiation of such an active radiation ray to the ink composition of the invention is typically in a range of 0.01 to 120 seconds, and is preferably in a range of 0.1 to 90 seconds.

Examples of conditions for the radiation of the active radiation ray and a basic method for the radiation include those disclosed in JP-A No. 60-132767. Specifically, light sources are arranged on both sides of a head unit containing a device for ejecting the ink, and then the head unit and the light sources are used for scanning in the so-called shuttle method. The active radiation ray is radiated after a predetermined time (that is typically in a range of 0.01 to 0.5 second, preferably in a range of 0.01 to 0.3 second, and more preferably in a range of 0.01 to 0.15 second) from the landing of the ink. When the period from the landing of the ink to the radiation is controlled to be a extremely short time in this way, the ink landed on the recoding medium can be prevented from spreading and blurring before the ink is cured. Further, in a case where the recording medium is a porous recording medium, since exposure can be conducted before the ink penetrates into a deep portion of the medium which radiated light cannot reach, remaining of unreacted monomers can be restrained so that an odor thereof can be decreased.

The curing may be completed with a different light source which is not accompanied with driving. Examples of the radiating method include a method including using an optical fiber and a method including applying light from a collimated light source onto a mirror face arranged on a side face of a head unit and radiating UV light onto its recording section, which are disclosed in the pamphlet of WO 99/54415. Such a curing method can also be applied to the inkjet recording process of the invention.

The recording medium to which the ink composition of the invention can be applied is not particularly limited, and examples thereof include: ordinary paper such as uncoated paper or coated paper; various non-absorbing resin materials, which are used in the so-called soft packaging; and a resin film obtained by molding any one of the resin materials into a film shape. Examples of the various resin films include PET films, OPS films, OPP films, ONy films, PVC films, PE films and TAC films. Examples of a plastic to form the recording medium further include polycarbonate, acrylic resin, ABS, polyacetal, PVA and rubbers. A metal or a glass may be used as the material of the recording medium.

Since the ink composition of the invention is small in thermal shrinkage when the ink composition is cured, and is excellent in adhesiveness to the recording medium, the composition has an advantage that a highly precise image can be formed onto a film even if the film is one which is easily curled or deformed by heat generated when the ink is cured and shrunken or the ink undergoes curing reaction, such as a PET film, an OPS film, an OPP film, an ONy film, or a PVC film, each of which can be thermally shrunken.

EXAMPLES

Hereinafter, the present invention will be described specifically with reference to Examples, but it should be understood that the invention is not restricted by these Examples.

Example 1

Synthesis of Inorganic Hollow Particles and Surface Treatment Thereof (1) Preparation of Polystyrene Latex 373 g of distilled water, 0.195 g of sodium dodecylsulfate, 0.65 g of potassium persulfate and 65 g of styrene were added into a 500 cm$^3$ separable flask, and the styrene was subjected to emulsion polymerization at 80° C. to yield a polystyrene. The polymerization conversion ratio thereof was 99% or more, and the particle diameter obtained thereby was 0.42 μm.

(2) Preparation of Coated Particles

An ethanol dispersion including 1.5 g/dm$^{-3}$ of the polystyrene latex obtained as described above, 1.8 mol/dm$^{-3}$ of titanium tetrabutoxide, 10 g/dm$^{-3}$ of polyvinyl pyrrolidone, and 1.6 mol/dm$^{-3}$ of water was put into a test tube coated with TEFLON® and equipped with a stopper. This test tube was left to stand still in a forcibly-blowing oven heated to 100° C. for 1.5 hours. The resultant reaction mixture was subjected to centrifugation at 3,500 rpm for 25 minutes. The supernatant was removed, distilled water was added and the resultant was again dispersed by ultrasonic waves. This washing operation was repeated 4 times, and then the resultant was filtrated with a membrane filter, and dried in a desiccator to yield coated particles.

(3) Preparation of Titanium Oxide Hollow Particles

The coated particles described above were put on a ceramic boat, and the boat was set into a firing furnace. The particles were heated to 600° C. at a temperature-raising rate of 10° C./minute in air, and matured for 3 hours. The volume average particle diameter of the thus-obtained particles was 0.47 μm, and the maximum particle diameter thereof was 0.6 μm. The ratio of the inside diameter of the cavities to the outside diameter of the particles (inside diameter/outside diameter) was 0.90.

(4) Preparation (Surface Treatment) of White Pigment 1

3.5 g of aluminum diisopropyrate mono secondary butyrate was dissolved into 1000 mL of isopropyl alcohol. 100 g of the titanium oxide hollow particles described above were added into this solution. The solution was stirred to cause the particles to be dispersed throughout the entire the solution so that the solution was made into a slurry. To the slurry solution was added 5 g of water, and the solution was stirred and matured at 30° C. for 60 minutes to conduct a hydrolysis reaction. Pure water was used as the water. The particles coated with aluminum oxide were finally washed with several tens of milliliters of acetone, and dried to yield a white pigment 1 (specific hollow particles), in which the titanium oxide hollow particles were coated with aluminum oxide.

Preparation of Ink Composition:

The pigment, a polymerization initiator, a sensitizing dye, and three polymerizable compounds were mixed at the following blending ratio and dispersed in a disperser to produce an ink composition of Example 1:

White pigment 1: 15% by mass

Polymerization initiator [triphenyl sulfonium salt (trade name: UVI-6992, manufactured by Dow Chemical Co.)]: 15% by mass Sensitizing dye [9,10-dibutoxyanthracene]: 1% by mass Polymerizable compound [3,4-epoxycyclohexylmethyl-3',4'-epoxycyclohexane carboxylate (trade name: CELOXIDE 2021A, manufactured by Daicel Chemical Industries, Ltd.-UCB Co., Ltd.)]: 45% by mass Polymerizable compound [3,7-bis(3-oxetanyl)-5-oxanonane (trade name: OXT-2 21, manufactured by Toagosei Co., Ltd.)]: 20% by mass Polymerizable compound [triethylene glycol divinyl ether]: 2% by mass DISPERBYK-111 (trade name, manufactured by BYK-Chemie): 2% by mass

Example 2

An ink composition of Example 2 was produced in the same manner as that of Example 1 except that 15% by mass of silica hollow particles produced in the following manner was used instead of 15% by mass of the white pigment 1. The surface treatment with aluminum oxide was performed using the same coating method as that for Example 1.

Preparation of Silica Hollow Particles

Hexadecylphosphocholine was dissolved into ethanol to prepare an oil phase. Thereafter, the resultant was kept at 80° C. for 4 hours, and subsequently kept at 40° C. After 30 minutes, a low-HLB surfactant was added to the oil phase. PEG and the same low-HLB surfactant were dissolved into a water phase of the resultant and, after 20 minutes, NH$_4$OH was added to the water phase as a catalyst while the phase was stirred. The water phase was added to the oil phase to form a water-oil emulsion. TEOS was added to the water-oil emulsion to conduct hydrolyzation. The resultant was subjected to centrifugation at 2,500 rpm for 15 minutes, washed with ethanol, and then dried at 40° C. for one day. The dried matter was finally fired at 600° C. for 6 hours. The volume average particle diameter of the thus-obtained particles was 0.90 µm, the maximum particle diameter thereof was 1.5 µm, and the ratio of the inside diameter of the cavities to the outside diameter of the particles (inside diameter/outside diameter) was 0.80.

Example 3

An ink composition of Example 3 was produced in the same manner as that for Example 1 except that 15% by mass of zinc oxide hollow particles produced as described below was used instead of 15% by mass of the white pigment 1. The surface treatment with aluminum oxide was performed using the same coating method as that for Example 1.
Preparation of Zinc Oxide Hollow Particles
PS beads were stirred in a solution of $Zn(NO_3)_2.6H_2O$ for 48 hours or more so that $Zn^{2+}$ was adsorbed on the surface of the cationic polystyrene resin. After this operation, urea was added to the PS beads at an amount of 1.0 mol/dm$^3$ per one gram of the PS beads. The pH of this mixture solution was adjusted to 5.5. In an atmosphere of $N_2$, the solution was heated at 90° C. for 3 hours or more. The beads were then collected by filtration, washed with distilled water, and dried at room temperature. $Zn_5(OH)_6.(CO_3)_2$ coated with the resin was dried and fired at 550° C. in air for 3 hours to yield zinc oxide hollow particles. The volume average particle diameter of the thus-obtained particles was 0.95 µm, the maximum particle diameter thereof was 3.0 µm, and the ratio of the inside diameter of the cavities to the outside diameter of the particles (inside diameter/outside diameter) was 0.85.

Example 4

An ink composition of Example 4 was produced in the same manner as that for Example 1 except that 15% by mass of the organic hollow particles having the following conditions was used instead of 15% by mass of the white pigment 1.
The organic hollow particles used in Example 4 were inorganic-organic hybrid hollow particles prepared by subjecting commercially-available organic hollow particles [trade name: SX 866 (A), manufactured by JSR Corp., volume average particle diameter: 0.30 µm, maximum particle diameter: 0.50, and ratio of the inside diameter of the cavities to the outside diameter of the particles (inside diameter/outside diameter): 0.70] to surface treatment with aluminum oxide. The surface treatment with aluminum oxide was performed using the same coating method as that for Example 1.

Example 5

An ink composition of Example 5 was produced in the same manner as that for Example 1 except that 15% by mass of a mixture containing the white pigment 1 and titanium oxide particles (trade name: TIPAQUE CR, manufactured by Ishihara Sangyo Kaisha, Ltd.), which have been further subjected to surface treatment with aluminum oxide and have no hollow, were used in place of 15% by mass of the white pigment 1 so that a ratio of an amount of the white pigment 1 to that of the titanium oxide particles became 1:1.

Comparative Example 1

An ink composition of Comparative example 1 was produced in the same manner as that for Example 1 except that 15% by mass of titanium oxide particles (trade name: TIPAQUE CR, manufactured by Ishihara Sangyo Kaisha, Ltd.), which have been further subjected to surface treatment with aluminum oxide and have no hollow, were used in place of 15% by mass of the white pigment 1.

Comparative Example 2

An ink composition of Comparative example 2 was produced in the same manner as that for Example 1 except that 15% by mass of an organic white pigment (trade name: SHIGENOX OWP, manufactured by Showa Kagaku Kogyo Co., Ltd.) was used in place of 15% by mass of the white pigment 1.
Evaluation of Ink Compositions
The ink compositions obtained in Examples 1 to 3 and Comparative Examples 1 and 2 were subjected to evaluation tests in terms of the viscosity, the dispersibility, the pigment-precipitating property, the re-dispersibility and the ejection stability in accordance with the following methods. More specifically, an image formation was performed by using each of the ink compositions, and the curability, the masking property, the weather resistance and the heat resistance of the resultant cured film (ink image) were evaluated in accordance with the following methods.
1. Viscosity
An E-type viscometer (manufactured by Toki Sangyo Co., Ltd.) was used to measure the viscosity of each of the ink compositions at 40° C., and then the viscosity was evaluated in accordance with the following criteria. The results are shown in Table 1.
A: Viscosity is less than 30 mPas.
B: Viscosity is 30 mPas or more and less than 100 mPas.
C: Viscosity is 100 mPas or more (a level at which a problem was caused when the ink composition was jetted out).
2. Pigment-Precipitating Property
Each of the ink compositions was left to stand still in a 50 mL glass container at room temperature for 1 month, and then the precipitation state (dispersion stability-maintenance state) of the pigment was evaluated by visual observation. The compositions were ranked as one of three levels 3, 2 and 1, in order of least precipitation. The results are shown in Table 1.
3. Re-Dispersibility
A centrifuge was used to separate each of the ink compositions centrifugally at a rotation number of 5000 rpm for 30 minutes, thereby causing the composition to forcibly precipitate. Thereafter, the composition was stirred to evaluate the re-dispersibility thereof. The composition was ranked as one of three levels 3, 2 and 1, in order of most favorable re-dispersibility. The results are shown in Table 1.
4. Ejection Stability
Each of the ink compositions was used to record characters continuously with an inkjet printer (trade name: UJF-605C, manufactured by Mimaki Co.) for 60 minutes. The ink composition was then ranked as one of the following levels A, B and C:
A: The ink composition was ejected without any problem.
B: A partial satellite was generated.
C: The image was partially missing due to omission of ink ejection from nozzle(s).
The results are shown in Table 1.
Evaluation of Cured Film
Each of the ink compositions was used to record characters on a piece of art paper with an inkjet printer (trade name: UJF-605C, manufactured by Mimaki Co.; print density: 300 dpi, jetting-out frequency: 4 kHz, number of nozzles: 64).

The thus-obtained characters were exposed to light from a deep UV lamp (trade name: SP-7, manufactured by Ushio Inc.) with energy of 15 mJ/cm². In this way, a character-recorded sample was obtained. After 10 minutes from the end of the recording, the sample was evaluated with respect to the following items.

5. Curability

The character-recorded face of the sample was evaluated in a tackiness-free test. The cured film was touched with the finger, and then ranked as one out of the following levels A, B and C:

A: The film was not tacky.

B: The film was slightly tacky.

C: The film was remarkably tacky.

The results are shown in Table 2. The symbol "-" is given for ink compositions that could not be evaluated.

6. Masking Property

Each of the ink compositions was painted onto a piece of black paper with a bar coater, and then the masking property of the film obtained after the composition was cured was evaluated with the naked eye. The composition was ranked as one out of three levels 3, 2 and 1 in order of favorable masking property. The results are shown in Table 2.

7. Weather Resistance

Each of the ink compositions was used to form an image on a photographic paper. A weather meter (trade name: ATLAS C. 165) was used to radiate xenon light (100000 lx) to the paper for 3 days. A reflection density meter (trade name: X-RITE 310TR, manufactured by X-Rite) was used to measure the density of the image before and after the radiation of xenon. The color remaining ratio, calculated therefrom, was used to evaluate the weather resistance. The measurement was made in a state in which the reflection density was fixed at 1.0. The sample was ranked as one out of the following levels A, B and C:

A: The color remaining ratio was 80% or more.

B: The ratio was less than 80%.

C: The ratio was less than 70%.

The results are shown in Table 2. The symbol "-" is given for samples that could not be evaluated.

8. Heat Resistance

Each of the ink compositions was used to record characters on a piece of pottery with an inkjet printer (trade name: UJF-605C, manufactured by Mimaki Co.; print density: 300 dpi, jetting-out frequency: 4 kHz, number of nozzles: 64), and then exposed to light from a deep UV lamp (trade name: SP-7, manufactured by Ushio Inc.) with energy of 15 mJ/cm². In this way, a character-recorded sample was obtained.

After 10 minutes from the end of the recording, the sample was fired at 1,000° C. The color remaining ratio was obtained, and then used to evaluate the heat resistance. The measurement was made in a state in which the reflection density was fixed at 1.0. The sample was ranked into one out of the following 5 levels A, B, C, D and E:

A: The color remaining ratio was 80% or more.

B: The ratio was from 60 to 80%.

C: The ratio was from 40 to 60%.

D: The ratio was from 20 to 40%.

E: No dye was able to be perceived.

The results are shown in Table 2. The symbol "-" is given for ink compositions that could not be evaluated.

TABLE 1

| | Viscosity | Pigment-precipitating property | Re-dispersibility | Ejection stability |
|---|---|---|---|---|
| Example 1 | A | 3 | 3 | A |
| Example 2 | A | 3 | 3 | A |
| Example 3 | A | 3 | 3 | A |
| Example 4 | A | 3 | 3 | A |
| Example 5 | A | 2 | 2 | B |
| Comparative Example 1 | A | 1 | 2 | C |
| Comparative Example 2 | A | 3 | 3 | A |

TABLE 2

| | Curability | Masking property | Weather resistance | Heat resistance |
|---|---|---|---|---|
| Example 1 | A | 3 | A | B |
| Example 2 | A | 3 | A | A |
| Example 3 | A | 3 | A | A |
| Example 4 | A | 3 | A | C |
| Example 5 | A | 3 | A | B |
| Comparative Example 1 | — | 3 | — | — |
| Comparative Example 2 | A | 3 | C | E |

It can be understood from Table 1 that each of the ink compositions of Examples 1 to 5, wherein organic or inorganic-organic hybrid hollow particles were used as a white pigment, was an ink composition having a low viscosity and good dispersibility, suppression of precipitation of the pigment contained therein, and re-dispersibility, as well as being free from clogging of nozzles, so as to provide excellent ejection stability.

It can also be understood from Table 2 that each of the ink compositions of Examples 1 to 5 was good in curability, and gave an image (film) favorable in masking property, weather resistance and heat resistance.

On the other hand, it can be understood that the ink composition of Comparative Example 1, wherein titanium oxide was used as a white pigment, was an ink composition poor in precipitating property of the pigment contained therein and ejection stability. Furthermore, the ink composition of Comparative Example 1 was unable to provide an image with an inkjet printer. Thus, the curability, masking property and heat resistance thereof were unable to be evaluated.

Moreover, it can be understood that the ink composition of Comparative Example 2, wherein white organic particles were used, was poor in weather resistance and heat resistance of an image formed therefrom. Thus, the scope of use of such an ink composition is limited.

CROSS-REFERENCE TO RELATED APPLICATION

This application claims priority under 35 USC 119 from Japanese Patent Application No. 2006-033994, the disclosure of which is incorporated by reference herein.

What is claimed is:

1. An inkjet ink composition comprising: a white pigment; a polymerizable compound; and a polymerization initiator; wherein the white pigment comprises inorganic-organic hybrid hollow particles comprising hollow organic particles coated with an inorganic material; and wherein the coating of inorganic material is formed using a hydrolysis reaction of a metal alkoxide.

2. The inkjet ink composition according to claim 1, wherein the ratio of the average inside diameter of cavities in the inorganic-organic hybrid hollow particles to the average outside diameter of the inorganic-organic hybrid hollow particles is in the range of from 0.4 to 0.95.

3. The inkjet ink composition according to claim 1, wherein the volume average particle diameter of the inorganic-organic hybrid hollow particles is in the range of from 0.01 to 1.0 µm.

4. The inkjet ink composition according to claim 1, wherein the coating of inorganic material is titanium oxide.

5. The inkjet ink composition according to claim 1, wherein the surface of the inorganic-organic hybrid hollow particles is treated with at least one of Al, Si or Zr—Al.

6. The inkjet ink composition according to claim 1, wherein the amount of the inorganic-organic hybrid hollow particles is in the range of 5 to 30% by mass relative to the total amount of the ink composition.

7. The inkjet ink composition according to claim 1, wherein the polymerizable compound comprises (meth)acrylate.

8. The inkjet ink composition according to claim 1, wherein the white pigment further comprises one or more other white inorganic pigments that are different from the inorganic-organic hybrid hollow particles.

9. The inkjet ink composition according to claim 8, wherein the other white inorganic pigments comprise titanium oxide.

10. The inkjet ink composition according to claim 9, wherein the titanium oxide is pre-treated with alumina, zinc, zirconia, or a basic organic material.

* * * * *